(12) United States Patent
Lindgren

(10) Patent No.: US 8,643,488 B2
(45) Date of Patent: Feb. 4, 2014

(54) PHYSICAL FINITE ELEMENT MODEL

(75) Inventor: Lawrence S. Lindgren, Redmond, WA (US)

(73) Assignee: The Boeing Company, Chicago, IL (US)

( * ) Notice: Subject to any disclaimer, the term of this patent is extended or adjusted under 35 U.S.C. 154(b) by 446 days.

(21) Appl. No.: 12/022,320

(22) Filed: Jan. 30, 2008

(65) Prior Publication Data

US 2009/0189784 A1 Jul. 30, 2009

(51) Int. Cl.
*G08B 13/14* (2006.01)
(52) U.S. Cl.
USPC ............ 340/572.1; 340/505; 702/35; 714/25
(58) Field of Classification Search
USPC ................ 340/572.1, 505; 702/188, 35, 182; 714/25; 701/29; 367/180; 73/786
See application file for complete search history.

(56) References Cited

U.S. PATENT DOCUMENTS

| | | | |
|---|---|---|---|
| 5,892,441 A * | 4/1999 | Woolley et al. | 340/539.26 |
| 7,068,170 B2 * | 6/2006 | Green | 340/572.1 |
| 7,103,507 B2 * | 9/2006 | Gorinevsky et al. | 702/184 |
| 7,343,265 B2 * | 3/2008 | Andarawis et al. | 702/188 |
| 7,627,439 B1 * | 12/2009 | Kessler et al. | 702/35 |
| 7,647,206 B2 * | 1/2010 | Ford | 702/183 |
| 2005/0073435 A1 * | 4/2005 | Voeller et al. | 340/933 |
| 2007/0265790 A1 * | 11/2007 | Sealing et al. | 702/33 |
| 2009/0085738 A1 * | 4/2009 | Darianian et al. | 340/539.11 |

\* cited by examiner

*Primary Examiner* — Steven Lim
*Assistant Examiner* — Hongmin Fan
(74) *Attorney, Agent, or Firm* — Caven & Aghevli LLC

(57) ABSTRACT

A plurality of RFIDs is installed on aircraft or other structure. The RFIDs can query one another upon original installation and in response to predetermined event detection, and determine their relative locations within a mesh. The determined location data and other information are stored within the respect memories of the RFIDs. The stored data can be later accessed and used in analyzing damage or structural failure of the aircraft. Corrective measures are thus expedited because before-and-after structural comparisons can be readily made, with or without reference to original engineering data for the aircraft.

14 Claims, 4 Drawing Sheets

| | | |
|---|---|---|
| 302 — TAG DESIGNATION | T-26754-A | |
| 304 — CRAFT DESIGNATION | SOUTHWEST S34176 B737-300 | |
| 306 — GENERAL LOCATION | SKIN PANEL 157 | |
| 308 — MATERIAL REF. NO. | AA2024 | |
| 310 — DRAWING REF. NO. | 987123 TO 987131 | |
| 312 — INSTALLATION DATE | 25-MAY-2008  11:25 UTC | |
| 314 — LAST EVENT DATE | 27-JULY-2008  03:44 UTC | |
| 316 — 1 - ORIGIN DATA | T-26760-A | (20, 20, 0) |
| 318 — 1 - LAST EVENT DATA | T-26760-A | UNCHANGED |
| 320 — 2 - ORIGIN DATA | T-26758-A | (20, -20, -3) |
| 322 — 2 - LAST EVENT DATA | T-26758-A | UNCHANGED |
| 324 — 3 - ORIGIN DATA | T-26761-A | (-20, -20, -2) |
| 326 — 3 - LAST EVENT DATA | T-26761-A | (-24, -18, -1) |
| 328 — 4 - ORIGIN DATA | T-26769-A | (-20, 20, 0) |
| 330 — 4 - LAST EVENT DATA | T-26769-A | (-22, 24, 2) |

PHYSICAL FINITE ELEMENT MODEL

FIELD OF THE DISCLOSURE

The field of the present disclosure relates to aircraft instrumentation, and more specifically, to automatically detecting and reporting damage and related structural data for an aircraft by way of a mesh of radio frequency identification devices.

BACKGROUND OF THE DISCLOSURE

Aircraft occasionally sustain damage that is overlooked. In rare cases, stress and the resulting material fatigue can worsen. Once damage is reported, repair team personnel often expend a considerable amount of time locating, retrieving and analyzing structural and design data for an aircraft. Such retrieval and analysis can require many days or weeks, resulting in protracted "down time" for the aircraft. Additionally, analysis and determination of corrective measures requires that the necessary structural and design information be accessible in the first place. Therefore, improved damage detection and reporting, as a well as ready access to necessary data, would have great utility.

SUMMARY

Damage and other structural failures are detected and represented by data stored within the memories of RFIDs installed within an aircraft or on another structure. Data stored therein can be retrieved at a later time and analyzed towards determining corrective actions. Structural trouble detection and correction is thus expedited by the present teachings.

In one implementation, a system includes a structure and a plurality of radio frequency identification devices (RFIDs) supported by the structure. At least one of the RFIDs is configured to determine a designation and a location of at least one other RFID proximate thereto by way of wireless signals.

In another implementation, an aircraft includes one or more structural elements. The aircraft further includes a plurality of radio frequency identification devices (RFIDs) supported at respective locations by the one or more structural elements. The plurality of RFIDs define respective nodes of a mesh. At least one of the RFIDs includes a memory and is configured to determine a designation and a location of at least one other RFID proximate thereto within the mesh by way of wireless signals. The at least one RFID is also configured to store the designation and the location of the at least one other RFID in the memory. The at least one RFID is further configured to transmit at least some information stored in the memory by way of wireless signals.

In yet another implementation, a method includes providing first and second radio frequency identification devices (RFIDs). The first RFID includes a memory. The method also includes determining a designation and a location of the second RFID by way of wireless signals, wherein the determination is made by the first RFID. The method also includes storing the designation and the location of the second RFID in the memory of the first RFID.

The features, functions, and advantages that are discussed herein can be achieved independently in various embodiments of the present disclosure or may be combined various other embodiments, the further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure introduces systems and methods for implementing a damage and/or structural failure detection system within an aircraft or other entity. Many specific details of certain embodiments of the disclosure are set forth in the following description and in FIGS. 1-6 to provide a thorough understanding of such embodiments. One skilled in the art, however, will understand that the disclosure may have additional embodiments, or that the disclosure may be implemented without several of the details described in the following description.

Illustrative Operating Environment

Figure 1:
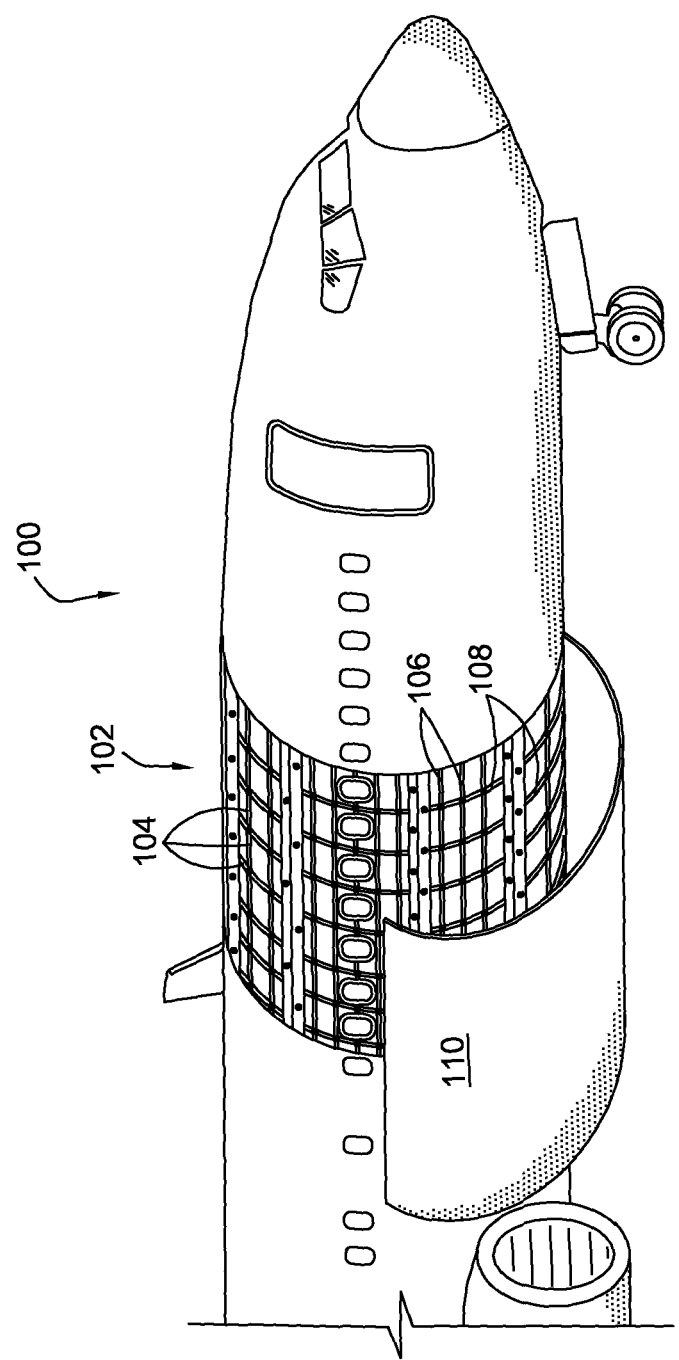
FIG. 1 is a partial cutaway view of an aircraft according to one operational environment.

FIG. 1 is a partial cutaway view of an aircraft 100. The aircraft 100 is illustrative and non-limiting with respect to the present teachings. The aircraft 100 includes a structure 102 comprising a plurality of structural elements 104. The structural elements 104 collectively define a framework or "skeleton" for the aircraft 100. In particular, structural elements 104 that are oriented fore-to-aft (i.e., longitudinally) with respect to the overall aircraft are referred to as stringers 106. Structural elements 104 that extend circumferentially (i.e., about the longitudinal axis) are referred to as frame elements 108. The structure 102 further includes a plurality of skin panels 110 that are respectively joined or bonded to the structural elements 104.

The stringers 106, frame elements 108 and skin panels 110 are typically—but not necessarily—formed of aluminum alloys. However, other materials can also be used for the respective elements 106, 108 and 110 of the structure 102. In any case, the aircraft 100 includes skin panels 110 mechanically bonded to a frame-like structure 102 so as to define an enclosed interior volume or cabin space.

During normal flight operations, the various structural aspects of the aircraft 100 will shift a minimal amount. In the event of damage due to collision, mechanical fatigue, weld or joint failure, etc., one or more structural aspects (frame members, skin panels, etc.) will be deformed and/or displaced relative to their original conditions or locations. Thus, for example, if a weld at one end of a stringer 106 fails, then that particular stringer 106 is likely to shift in position relative to other stringers 106, frame elements 108 and/or skin panels 110 proximate thereto. Similar changes can also be expected when two or more structural elements are involved.

If the relative positions of most or all structural elements are determined at some original time (i.e., newly assembled state), and then their relative positions compared at some future time, any change in those relative positions can be used to detect and analyze damage, fatigue, etc. sustained by the aircraft 100. Furthermore, if the geometry (i.e., dimensions, planar or curved surface form, etc.) of individual structural elements—such as respective skin panels—can be determined at an original time, and then compared to the geometry of that element at some future time, than deformation (e.g., bending or denting) of that structural element can be detected and analyzed. In any case, the capacity to detect changes in the structural form 102 of aircraft 100 relative to a previously determined data set is germane to the present teachings.

Illustrative Mesh

Figure 2:
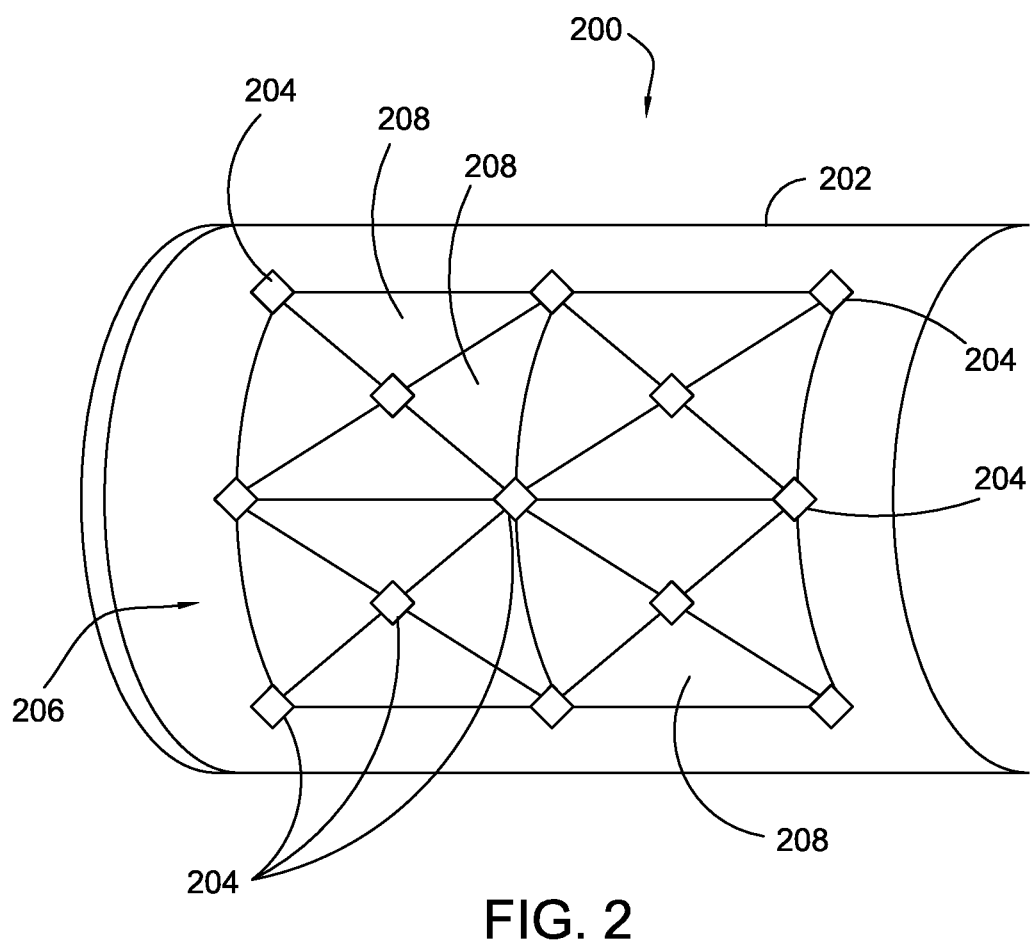
FIG. 2 is a perspective view depicting an illustrative RFID mesh according to one implementation.

FIG. 2 is a perspective view depicting a structural element 200 according to an illustrative implementation of the present teachings. The structural element 200 is a skin panel 202 of an aircraft (e.g., 100) defined by a curved surface geometry. For purposes of illustration, it is assumed that the skin panel 202 is formed of 2024 aluminum alloy. However, it is to be understood that the skin panel 202 is illustrative in nature, and that the particular geometry and/or constituency thereof are neither critical to nor limiting of the present teachings. The skin panel 202 is understood to be in new condition and form.

The skin panel 202 supports a plurality of radio frequency identification devices (RFIDs) 204. The RFIDs 204 are supported by and bonded to the skin panel 204 in an arrangement defining a mesh 206. The mesh 206 is defined such that each RFID 204 is located at a respective vertex (i.e., node) thereof. Thus, the mesh 206 is a conceptual construct, representative of the arrangement of the respective RFIDs 204 relative to one another. The mesh 206 can be considered to comprise numerous triangular finite elements 208, each defined by a triad of particular RFIDs 204. Any particular RFID 204 can define a node of one or more finite elements 208. Thus, as depicted, the mesh 206 is inclusive of thirteen RFIDs 204 defining sixteen finite elements 208. It is further noted that the particular placement of the RFIDs 204 and the finite elements 208 defined thereby is/are arbitrary in nature, and that other placement schemes and/or mesh constructs (i.e., conceptual connections between vertices) can also be defined and used. In any case, the mesh 206 is representative of the dimensions and surface curvature—the original physical state—of the skin panel 202.

The RFIDs 204 are respectively configured to communicate with each other and with external entities by way of wireless signals. Each RFID 204 is configured to determine the relative location of other RFIDs 204 proximate thereto (i.e., neighboring nodes) within the mesh 206. Each RFID 204 is further configured to store the determined relative locations in an internal memory for future reference. The location determinations can be related in 2-space (e.g., x,y) or 3-space (e.g., x,y,z) relative to the particular RFID 204 making the determination. Such determinations can be made, for example, using time-of-flight analysis, Doppler shift analysis, phase shifting analysis, or other methods involving wireless signals for determining relative location in terms of direction and distance (i.e., spatial vectors). The internal memory of each RFID 204 can be non-volatile such that information can be stored therein without a continual drain on power resources (internal or external). Further elaboration on the resources and information storage of the RFIDs 204 is provided hereinafter.

Illustrative Data Store

Figures 3, 4:
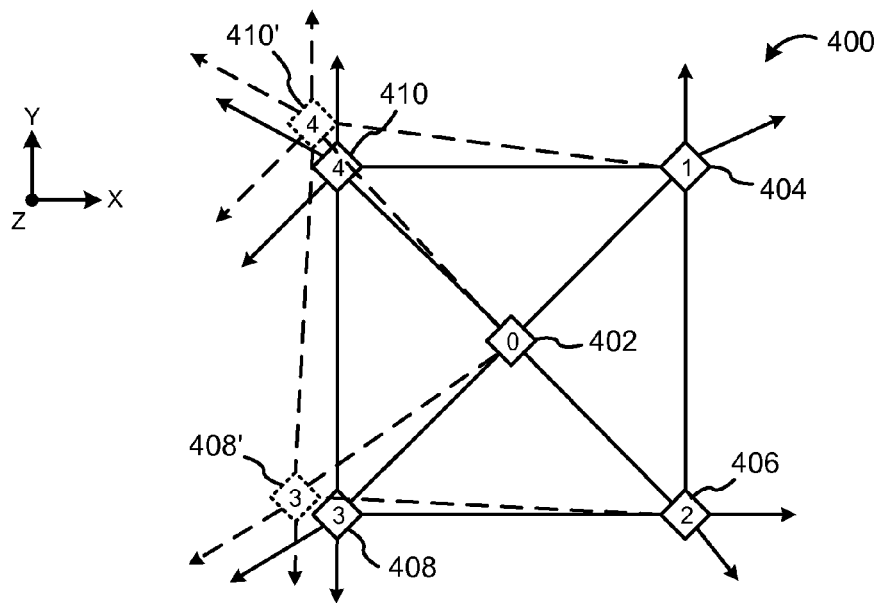
FIG. 3 is table depicting illustrative data according to one implementation.
FIG. 4 is an diagrammatic view depicting an RFID mesh in accordance with one implementation.

FIG. 3 depicts a table 300 including data stored within a memory of particular RFID according to an illustrative implementation. The table 300 includes particular information and order of storage. However, it is to be understood that certain information can be omitted, and/or other information included and stored as depicted or in another order, within respective data slots according to other implementations. Thus, the table 300 is illustrative and non-limiting with respect to the present teachings. Certain aspects of the table 300 will be described with reference to the RFID mesh 400 of FIG. 4 in the interest of clarity.

The table 300 includes a unique tag designation, or serial number, 302. For purposes of non-limiting illustrations, it is assumed that the designation 302 corresponds to the RFID 402 of FIG. 4. The designation can include any sequence of alphanumeric characters, symbology, and/or other suitable information. Table 300 also includes a craft designation 304. The craft designation 304 corresponds to the unique identity of an aircraft in which the RFID of table 300 is installed. The craft designation 304 can include any suitable identifying information (serial numbers, model numbers, etc.). For purposes of the ongoing example, it is assumed that the RFID 402 is installed within a particular aircraft owned by a commercial air carrier.

The table 300 also includes general location information 306. The general location 306 can be the designation for a particular structural element of the corresponding aircraft and can be keyed to an overall designation plan for such elements. As depicted, the RFID 402 is installed on a particular skin panel. The table 300 includes a material type or reference number 308 for the element supporting the RFID. The material reference can refer to a metallic alloy, synthetic composite material, etc. In any case, the material type 308 provides engineers and other personnel with structural data that can be used during future analysis.

The table 300 includes drawing reference number(s) 310. The drawing reference(s) 310 can include any information keyed to original plans or drawings corresponding to the installed location of the corresponding RFID (e.g., 402). In this way, engineers can refer to these numbers or identifying marks when seeking original and/or amended technical information regarding the aircraft (or other vehicle or structure) in which the RFID 402 is mounted. The table 300 also includes installation date 312. The installation date 312 can include calendar date information, time of day, or any other similar data corresponding to the mounting and/or original activation of the RFID 402 within an aircraft or other structure. Any suitable formatting, time zone-related information, universal time and/or date, etc., can be stored under installation date 312. The table 300 also includes a last event date 314. The last event date 314 can include calendar date information, time of day, or any other similar data corresponding to the most recent occurrence of a predefined (i.e., predetermined) event detected by the RFID 402. Such predetermined events can include, for example, query of the RFID by wireless signals, detection of a mechanical shock in excess of a selected threshold, detection of vibration in excess of a selected threshold, etc. Other predetermined events can also be defined and used. Any suitable formatting, time zone-related information, universal time and/or date, etc., can be stored under last event date 314.

The table 300 further includes first origin data 316. The first origin data 316 corresponds to information determined in regard to another RFID adjacent to, or proximate, the corresponding RFID storing the table 300. For purpose of ongoing example, it is assumed that the first origin data 316 corresponds to a wireless query of the RFID 404 within mesh 400 at the time recorded under installation date 312. The first origin data 316 includes a (unique) designation for RFID 404, as well as the relative location of RFID 404 with respect to RFID 402. The location data can be provided as any units appropriate to the coordinate system employed such as, for example, inches, feet, millimeters, centimeters, etc. Other units can also be used. The location data within first origin data 316 refers to the 3-space location of the RFID 404 relative to RFID 402. As depicted, RFID 404, as determined at the time of installation, was located 20 millimeters by 20 millimeters by 0 millimeters from RFID 402 in the context of a 3-dimensional Cartesian coordinate system (i.e., x,y,z). Other locating systems using appropriate units can also be employed (e.g., spherical coordinates, polar coordinates, etc.).

The table 300 further includes first last-event data 318. The last-event data 318 includes the designation for RFID 404 (i.e., the RFID determined at time of installation date 312) for verification purposes, and the relative location of RFID 404, as determined by wireless signals at the time of the last event date 314. Thus, the location data recorded (stored to memory) under 318 can be compared to the location data recorded under first origin data 316 to determine if the RFID 404 has been displaced (e.g., due to collision, fatigue, joint failure, etc.). Coordinates (e.g., x,y,z, etc.) consistent with those of the first origin data 316 can be stored under 318. As depicted, for purposes of non-limiting example, the information "UNCHANGED" is recorded at 318 to indicate that no shift in relative position for RFID 404 has been determined.

The table 300 further includes second, third and fourth origin data 320, 324, and 328, respectively, corresponding to other RFIDs adjacent to RFID 402 in the mesh 400. As depicted data 320, 324 and 328 correspond to RFIDs 406, 408 and 410, respectively. Each of the stored data 320, 324 and 328 includes a unique designation for the corresponding RFID, as well as the originally determined relative location of that RFID in 3-space Cartesian coordinates, as determined at installation date 312. The table 300 further includes second, third and fourth last-event data 322, 326, and 330, respectively, corresponding to RFIDs 406, 408 and 410. The last-event data 322, 326 and 330 include the designation and relative location of the RFIDs 406, 408 and 410, respectively, as determined at the last event date 314. As depicted, the second last-event data 322 for RFID 406 is "UNCHANGED", indicating that no shift in relative location was determined (i.e., detected, or calculated). In contrast, the third and fourth last-event data 326 and 330 indicate that RFIDs 408 and 410 have shifted by respective amounts to new relative locations, as depicted by 408' and 410'. Thus, as depicted, RFID 408 has been displaced by (−4 mm, 2 mm, 1 mm) relative to its original location as determined at date 316. In turn, RFID 410 has been displaced by (−2 mm, 4 mm, 2 mm) relative to its original location as determined at date 316. The origin and last-event data can be compared and analyzed so as to calculate (i.e., estimate) the location and extent of damage or fatigue suffered by the structural element (i.e., skin panel 157) supporting the mesh 400.

The table 300 includes origin and last-event data corresponding to four distinct RFID devices adjacent to the RFID device of the table 300 (i.e., RFID 402). However, the table 300 is an illustrative and non-limiting implementation, and other tables consistent with the present teachings can include data corresponding to any practical number of adjacent RFID devices. It is further understood that every RFID within a mesh (e.g., 402, 404, 406, 408 and 410, etc.) includes a corresponding table according to the present teachings. In this way, the respective tables of data for all of the RFID devices installed on a particular craft or structure collectively represent the original and last-event geometric condition of the craft (or structure) as a finite element mesh. The overall scale of such a mesh, in terms of typical or average finite element size, is determined by the number and spacing of the RFIDs installed. Thus, both the quantity of stored data and the physical resolution thereof are selectively determinable.

Illustrative Method

Figure 5:
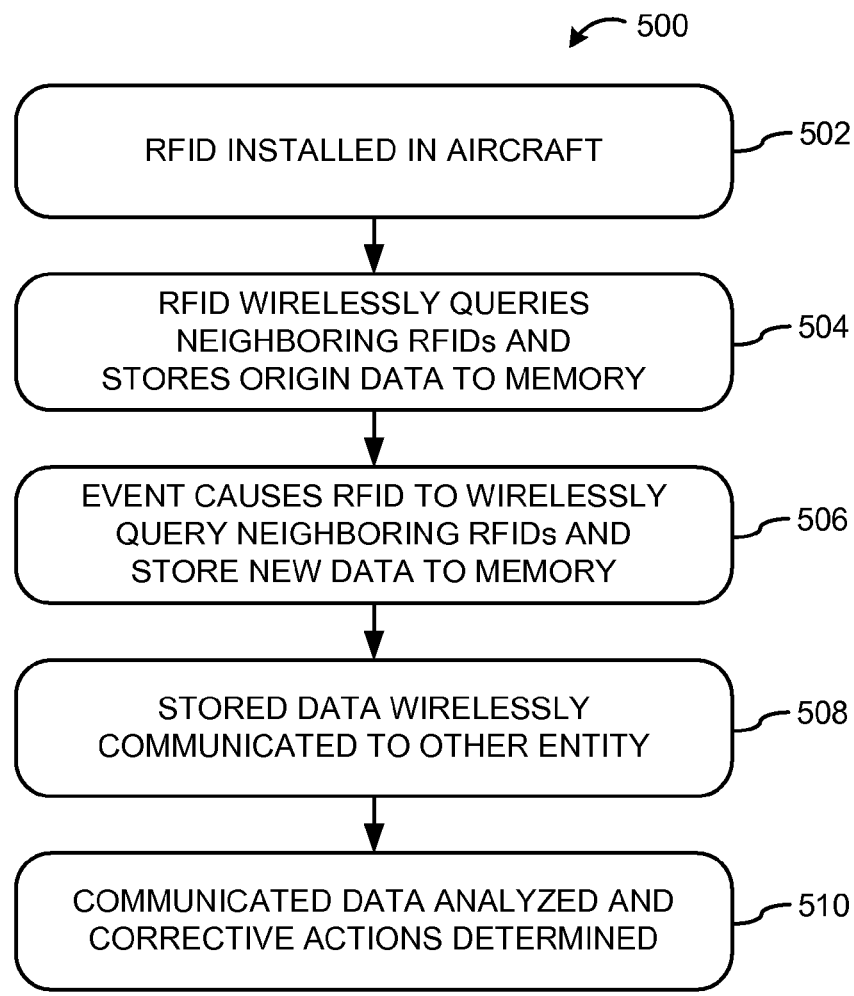
FIG. 5 is a flow diagram depicting a method in accordance with one implementation.

FIG. 5 is a flow diagram 500 depicting a method in accordance with one implementation of the present teachings. The diagram 500 depicts particular method steps and order of execution. However, it is to be understood that other implementations can be used including other steps, omitting one or more depicted steps, and/or progressing in other orders of execution without departing from the scope of the present teachings.

At 502, an RFID is installed on a structural element of an aircraft. For purposes of non-limiting illustration, it is assumed that the RFID is bonded to a stringer (e.g., 104) of a commercial airliner. It is further assumed that numerous other RFIDs have been similarly installed on the same or other structural elements within the same aircraft such that the whole aircraft structure, or select portions thereof, is/are represented by way of one or more meshes defined by the RFIDs. In another implementation, the RFIDs are installed on another structure or entity (marine vessel, building structure, automobile, bridge, etc.). It is further assumed that the RFID is provided with certain initial information from an external entity. Such provision can be made by wireless signals, direct cabling, optical signal communication, a temporarily wired connection, etc. The initial information can include any suitable data such as, for non-limiting example, a unique designation (identity) of the RFID, an identity of the supporting structure or craft, information keyed to engineering data regarding the structure or craft, etc. Furthermore, one (or more) of the RFIDs may be installed at a location (arbitrarily) designated as an origin or master reference point (i.e., 0,0,0) location on the aircraft such as, for example, the inside geometric center of the nose, etc.

At 504, the newly installed RFID queries neighboring RFIDs within the associated mesh by way of wireless signals and stores correspondingly determined original data within a memory. For example, such stored data may define a table 300 or the like according to the present teachings. The stored data can include, as non-limiting examples, respective designations and relative locations of the neighboring RFIDs, etc. At this point, the RFIDs and their respective data collectively represent the initial geometric condition of the aircraft or other structure on which they are installed.

At 506, the RFID detects a predetermined event. The predetermined event is assumed to occur at some future time (minutes, days, years, etc.) with respect to the installation and determinations of 502 and 504 above. The predetermined event can be defined by any suitable criteria such as, for non-limiting example, a wireless instruction to query the mesh of RFIDs, the detection of mechanical shock, etc. Other predetermined events can also be defined and used. In any case, the RFID queries at least the previously determined neighboring RFIDs and determines/verifies their respective designations and relative locations. The event-related data determinations are now stored to memory within the RFID. One or more other RFIDs within the associated mesh can also perform similar query, determination and data storage operations responsive to detecting the predetermined event.

At 508, the RFID communicates (i.e., transmits) some or all of the data stored within its memory to another entity by way of wireless signals. The data communication can be performed, for example, in response to a wireless query by the other entity, in response to the same or a different predetermined event as that of 506 above, etc. The communicated data can include, for example, origin and last-event data corresponding to various RFIDs of the mesh, the installed date of the RFID, the date of the last-event detection, or any or all other data stored in memory. One or more other RFIDs within the associated mesh can also perform similar data communication (i.e., upload) operations. The data can be communicated, for example, to a flight computer of the aircraft, to repair personnel by way of satellite communications equipment, etc.

At 510, the data communicated from the one or more RFIDs is analyzed to determine if damage or other failure has been sustained by the aircraft (or structure), and corrective actions are determined, if necessary. Such analysis can include, for example, finite element modeling, cross-referencing of remotely stored engineering data, consideration of materials properties, etc. Any suitable analytic techniques can be employed with respect to the data gleaned from the RFIDs and/or other resources.

Illustrative RFID

Figure 6:
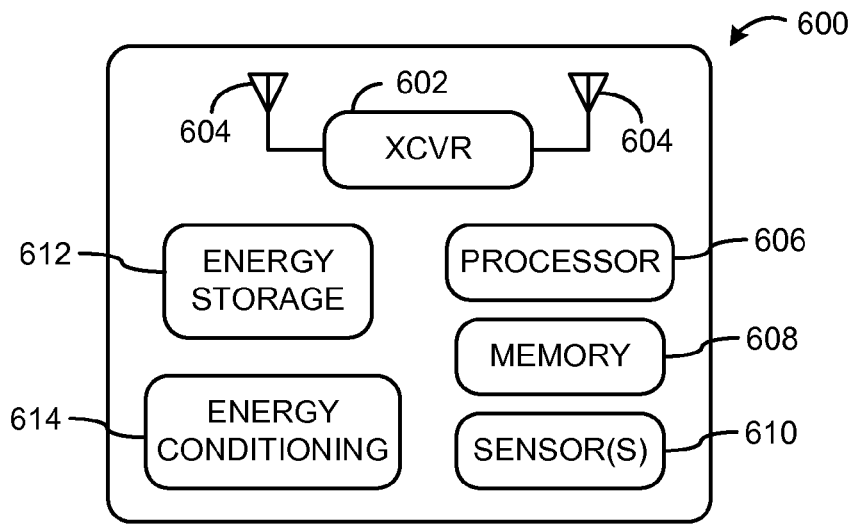
FIG. 6 is a block diagrammatic view depicting an RFID in accordance with one implementation.

FIG. 6 is an illustrative RFID 600 in accordance with the present teachings. The features and resources of the RFID 600 are exemplary and non-limiting in nature, and are intended to provide clear understanding of the present teachings. However, other RFIDs having respectively varying characteristics and resources can also be used in accordance with the present teachings.

The RFID 600 includes a transceiver 602 coupled to one or more antennas 604. The transceiver 602 is configured to bi-directionally communicate with other entities external to (distinct from) the RFID 600 by way of wireless signals. While a total of two antennas 604 are depicted, it is to be understood that any suitable number of antennas can be used in accordance with the transceiver 602 so as to query other RFIDs, determine their respective locations via Doppler or phase-shifting principles, etc.

The RFID 600 also includes a processor 606. The processor 606 is configured to control various functions and operations of the RFID 600 in accordance with an executable program code. Such a program code can be included within memory (non-volatile or otherwise) of the processor 606, or stored within a memory 608, etc. In any case, the overall range of functions and capabilities of the RFID 600 are determined in whole or in part by program code executed by the processor 606. The RFID 600 includes memory 608. The memory 608 can be volatile or non-volatile in operation, or a combination of the two, and can be configured to store and retrieve data communicated to and/or determined by the RFID 600 during typical operations (e.g., flow diagram 500, etc.). The memory 608 can also store a program code for execution by the processor 606.

The RFID 600 also includes one or more sensors 610. The sensor(s) 610 can respectively include any instrumentation configured to detect one or more predetermined events. As non-limiting examples, the sensor(s) 610 can include accelerometers, thermistor or other temperature sensing components, electromagnetic radiation detectors, particle radiation detectors, etc. Other suitable sensor(s) 610 can also be used.

The RFID 600 further includes energy storage 612 and associated energy conditioning 614. The energy storage 612 can include any suitable battery, super-capacitor, or other electrical storage element or elements. In turn, the energy conditioning 614 is configured to properly regulate electrical power from and/or to the energy storage 612. For example, the energy conditioning 614 can be configured to recharge the battery or batteries of energy storage 612 when the RFID 600 is illuminated by (i.e., proximate to) an electromagnetic field of suitable characteristics. As another example, the energy conditioning 614 can control one or more aspects (voltage regulation, over current protection, etc.) of electrical energy being drawn from the energy storage 612 by one or more of the other resources 602, 606, 608 and/or 610 of the RFID 600.

The RFID 600 is illustrative of at least some of the features and resources of an RFID (e.g., 204, 402-410, etc.) according to the present teachings. Other RFIDs having other operative characteristics and/or resources can also be used.

While specific embodiments of the disclosure have been illustrated and described herein, as noted above, many changes can be made without departing from the spirit and scope of the disclosure. Accordingly, the scope of the disclosure should not be limited by the disclosure of the specific embodiments set forth above. Instead, the scope of the disclosure should be determined entirely by reference to the claims that follow.

What is claimed is:

1. A system, comprising:
  a structure; and
  a plurality of radio frequency identification devices (RFIDs) supported by the structure, wherein each of the plurality of RFIDs:
    queries one or more proximate RFIDs to determine initial relative location information for the one or more proximate RFIDs;
    stores the initial relative location information in a memory;
    in response to a predetermined event, queries the one or more proximate RFIDs to determine post-event relative location information for the one or more proximate RFIDs; and
    forwards the initial relative location information and the post-event relative location information to a remote processing device,
  wherein the remote processing device analyzes the post-event relative location information to determine whether the structure has experienced a damage event.

2. The system of claim 1 wherein the RFIDs determine relative location information using at least one of a time-of-flight analysis, a Dopler shift analysis, or a phase shifting analysis.

3. The system of claim 1 wherein the relative location information is stored in a data table in the memory, and wherein the data table stores information that identifies a craft designation, a location of an RFID on the structure, a material type, one or more reference numbers, an installation date and a last event date, and relative position data for one or more adjacent RFIDs.

4. The system of claim 1 wherein:
  the RFIDs collect location information at predetermined different times in response to one or more predetermined events; and
  the location information collected at different times is compared to determine whether the structure has experienced a damage event.

5. The system of claim 4 wherein the one or more predetermined events comprises a mechanical impact.

6. The system of claim 1 wherein the RFIDs communicate with an external entity using one or more wireless communication signals.

7. The system of claim 1 wherein each RFID of the plurality of RFIDs is supported by an element of the structure.

8. The system of claim 1 wherein the structure is of an aircraft.

9. An aircraft including one or more structural elements, the aircraft further comprising:
  a plurality of radio frequency identification devices (RFIDs) supported at respective locations by the one or more structural elements, the plurality of RFIDs defining respective nodes of a mesh, wherein at least a first RFID wherein each of the plurality of RFIDs:

queries one or more proximate RFIDs to determine initial relative location information for one or more proximate RFIDs;

stores the initial relative location information in a memory;

in response to a predetermined event, queries the one or more proximate RFIDs to determine post-event relative location information for the one or more proximate RFIDs; and forwards the initial relative location information and the post-event relative location information to a remote processing device, wherein the remote processing device analyzes the post-event relative location information to determine whether the structure has experienced a damage event.

10. The aircraft of claim 9 wherein the RFIDs determine relative location information using at least one of a time-of-flight analysis, a Dopler shift analysis, or a phase shifting analysis.

11. The aircraft of claim 9 wherein the relative location information is stored in a data table in the memory, and wherein the data table stores information that identifies a craft designation, a location of an RFID on the structure, a material type, one or more reference numbers, an installation date and a last event date, and relative position data for one or more adjacent RFIDs.

12. The aircraft of claim 9, further comprising a computer resource of the aircraft, wherein the RFIDs communicate at least some content stored in the memory to the computer resource using one or more wireless communication signals in response to a predetermined event.

13. The aircraft of claim 9 wherein:

the RFIDs collect location information at predetermined different times in response to one or more predetermined events; and the location information collected at different times is compared to determine whether the structure has experienced a damage event.

14. The aircraft of claim 9 wherein each RFID of the plurality of RFIDs includes a memory to store one or more of the following:

a unique designation of the RFID;

a designation of the aircraft supporting the RFID;

a designation of a structural element of the aircraft supporting the RFID;

a material type of the structural element of the aircraft supporting the RFID; or a date of installation of the RFID within the aircraft.

* * * * *